Aug. 28, 1956 C. P. MIES, JR 2,760,645
APPARATUS FOR PURIFYING EDIBLE OILS
Filed Nov. 21, 1951 3 Sheets-Sheet 1

INVENTOR.
Carl P. Mies Jr.
BY
Mann, Brown, and Hansmann
Att'ys.

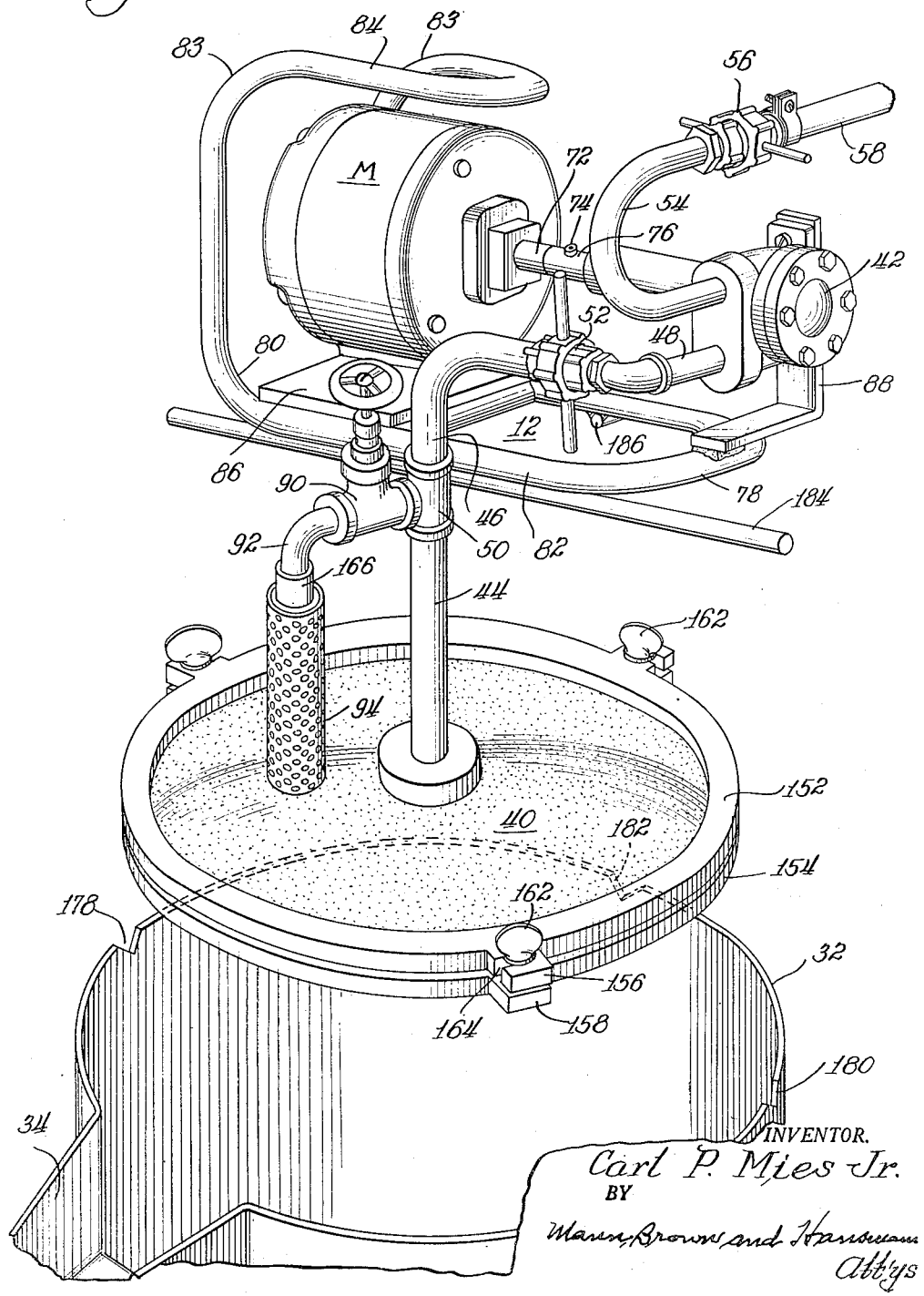

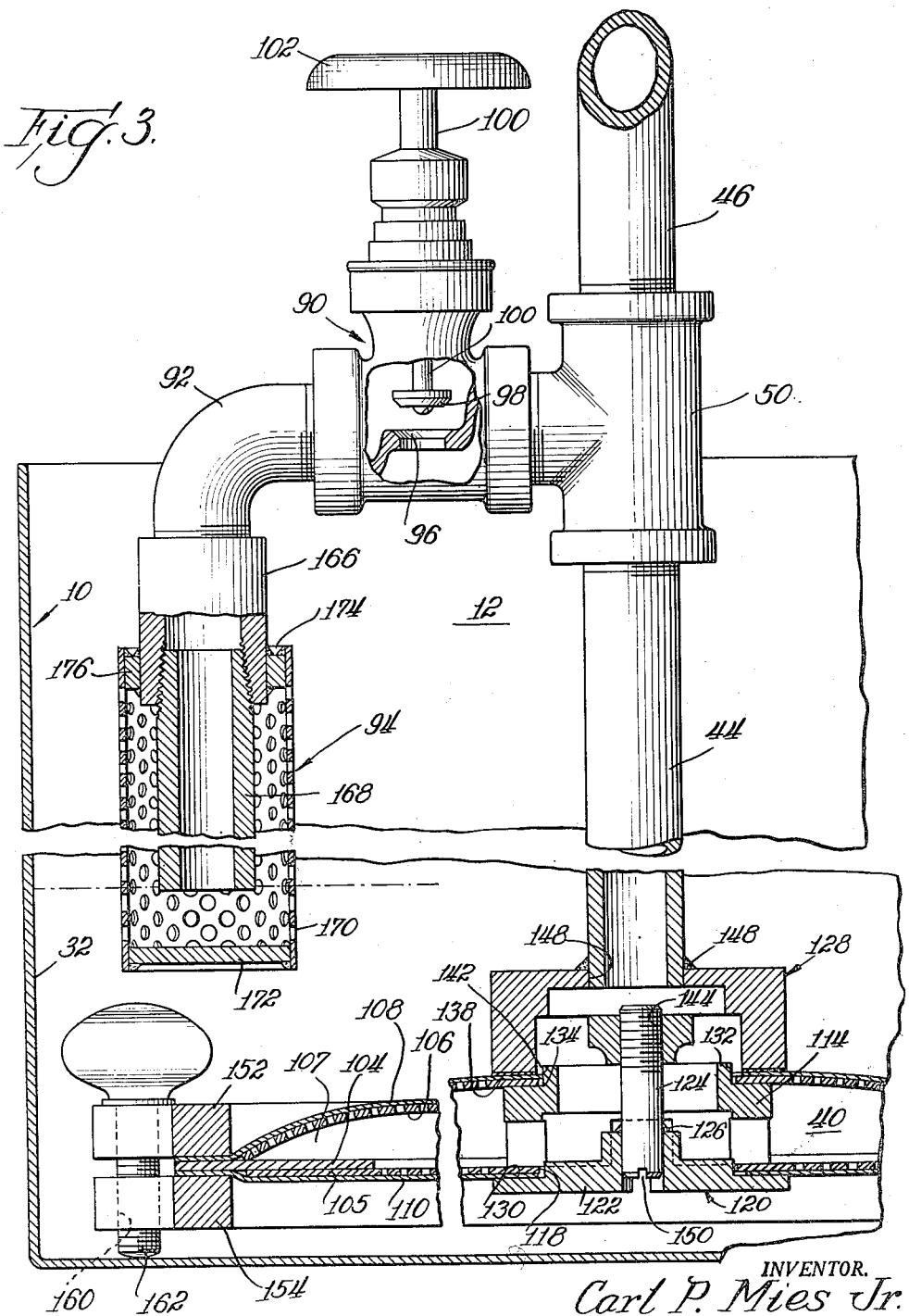

United States Patent Office 2,760,645
Patented Aug. 28, 1956

2,760,645

APPARATUS FOR PURIFYING EDIBLE OILS

Carl P. Mies, Jr., Prairie View, Ill.

Application November 21, 1951, Serial No. 257,540

9 Claims. (Cl. 210—150)

The improved filter apparatus of the present invention is primarily adapted for use in the purification of hot edible oils, particularly deep-frying oils and fats such as are ordinarily employed in the commercial processing of natural or prepared foodstuff such as nuts, doughnuts, potato chips, and various processed foods, as well as in large scale cooking, for instance in the preparing of French-fried potatoes, onions, and the like or in the deep-frying of seafood such as shrimp or other crustacea, oysters and other mollusca, and various other foodstuff too numerous to mention. The filter apparatus is, however, capable of other uses and the same may, if desired, be employed with or without modification in the purification of oils, other than edible oils, and of other liquids, whether these oils or liquids be heated or in the cold state.

The filter apparatus of the present invention is designed as an improvement over the apparatus shown and described in co-pending application, Serial No. 248,234, filed September 25, 1951, for Filtering Apparatus, of which this application is a continuation-in-part, and the entire disclosure of said earlier application is hereby incorporated by reference to the extent that it is not inconsistent with the present disclosure.

Commercial and institutional food processors have come to realize that the useful life of cooking oils can be greatly prolonged, and the quality of their products materially improved, by periodically filtering and reconditioning the cooking oils. Edible oils that are used over a considerable period of time without purification will become rancid and impart an unpleasant taste to the foodstuffs. Subsequent to the discovery that edible oils could be reconditioned, efforts have been made to provide suitable apparatus for accomplishing this purpose. None of the filters, however, has adequately met the unique problems presented in this field, and it is believed that one reason for this failure is because of the reluctance on the part of those concerned to depart from principles developed and used in other filtering fields, many of which are not truly applicable to the edible oil filter field.

Illustrative of the problems peculiar to the edible oil filter field is the fact that the majority of deep-fat fryers are located in restaurants, hotels and the like where only one or two fryers may be used, and hence the volume of oil to be treated is comparatively small. The help available to operate filtering apparatus in such institutions is generally a cook, a bus boy, or other kitchen help, none of whom is ordinarily skilled in the operation of mechanical devices. Since the edible oil is preferably filtered in a heated condition, the filtering apparatus must be sufficiently simple in operation to prevent harm from befalling a relatively unskilled operator, but at the same time it must, of course, be capable of efficiently reconditioning the oil.

The objects of the present invention are in general the same as those set forth in my above-mentioned co-pending application and are, namely, to overcome the limitations that are attendant upon the use of present-day commercial filters by the provision of a simple portable filtering apparatus which may be transported readily to the scene of food processing operations and caused to efficiently perform its filtering operation upon the batch of cooking oil or other liquid with a minimum of lost motion on the part of the operator.

In order that the more specific objects and advantages of the present invention may be better understood, at least a superficial understanding of the filtering apparatus shown and described in co-pending application above referred to is necessary. Accordingly, the prior apparatus as well as the present apparatus involves in its general organization a container and associated filtering instrumentalities which are capable of being transported to the scene of operations for the purification of a particular batch of liquid. At the scene of operations, the entire liquid of the batch may be drawn off into the container, thus substantially emptying the processing chamber of its contents. The filtering instrumentalities include a filter leaf assembly which is submerged in the drain-off liquid and which is operatively connected to the inlet side of a motor driven pump. The outlet side of the pump is connected by a flexible hose connection to a discharge tube having a hook portion by means of which it may be hooked over the edge of the deep-frying reservoir so that, when the pump is set into operation, the contaminated liquid in the container is drawn through the filter leaf construction and, in effect, pumped back into the cooking reservoir in a purified state. One or two cycles of operation, i. e. drawing off, filtering and restoring of the filtered liquid to the cooking reservoir is sufficient to effect the necessary degree of purification.

The present invention is designed as an improvement over the filtering apparatus briefly described above and, toward this end, it contemplates the provision of a by-pass conduit having a lower end which is adapted to be submerged in the drain-off body of liquid in the draw-off container and which is connected to the fluid line leading from the submerged filter leaf assembly to the inlet of the fluid pump and which further is provided with a control valve by means of which the by-pass conduit may be rendered effective or ineffective at will to withdraw fluid from the draw-off container and restore the same to the cooking reservoir. The by-pass conduit is of relatively large capacity and offers substantially less resistance to the flow of liquid therethrough than does the filter leaf assembly so that when the by-pass conduit is rendered effective a relatively large flow of liquid through the pump will result, thus making available at the nozzle end of the return conduit a forceful stream or jet of liquid which may be used for washing down purposes when the cooking reservoir is substantially empty. After the washing down operation, which serves to carry all of the sedimentary material into the draw-off container, the by-pass conduit may be rendered inoperative by closing the same so that the full force of the pump is applied to the submerged filter leaf construction after which normal filtering operations will take place and the purified liquid will be drained through the filter leaf assembly and pump and restored to the cooking chamber in a purified condition.

According to the present invention, the by-pass conduit may have associated therewith a coarse filter assembly for preventing the larger particles, which, through turbulence, may remain in suspension in the draw-off container, from being recirculated. It follows, therefore, that it is an object of the present invention to provide a filtering apparatus of the character briefly outlined above having associated therewith a submersible fine filter and a submersible coarse filter, both of which are adapted to be submerged in the body of liquid undergoing filtering, together with means for selectively rendering the two filters operative, one to perform washing down operations and the other to perform normal purifying operations. This selective operation is made possible by the fact that when the by-pass conduit together with its coarse filter is in operation, the external pressure of fluid on the filtering surface of the fine filter, or filter leaf is negligible and by the fact that any liquid passed therethrough is combined with the washing liquid issuing from the by-pass conduit and used for washing down purposes so that the filtering function of the filter leaf assembly is merely incidental and without effect during the washing down period. When the by-pass conduit is closed off, the filter leaf assembly becomes fully and solely effective to perform the purification or filtering function.

In the apparatus shown and described in copending application, the submersible filter leaf assembly is operatively connected to the inlet side of the fluid pump by a flexible conduit, thus enabling the filter leaf construction to be moved within the allowable limits of the flexible conduit and placed in a draw-off container or the like. According to the present invention, the filter leaf assembly is operatively connected to the inlet side of the pump by a rigid conduit and thus the danger of collapsing of the conduit under high subatmospheric pressures is obviated. Furthermore, the use of a rigid conduit between the filter leaf assembly and the fluid pump, in part at least, provides a rigid support for both the filter leaf assembly and the by-pass conduit assembly so that these two instrumentalities may assume definite positions with respect to each other, as well as with respect to the fluid pump, its driving motor and other relatively fixed parts of the filter assembly. Thus the assembly becomes a compact unit consisting of relatively fixed components which may be supported upon the rim of the draw-off container in such a manner that the filter leaf assembly and by-pass conduit assembly will assume definite fixed positions within the confines of the draw-off container which are conducive toward more efficient operation when the container is partially or fully filled with the liquid undergoing filtering.

The provision of a filtering apparatus of the character briefly outlined above being among the principal objects of the invention, a further object is to provide a novel form of draw-off container for use with the filtering apparatus per se which will readily accommodate the drawing off of liquid from most commercial forms of deep-frying reservoirs. A similar and related object is to provide such a container and associated filtering apparatus together with means on the container and on the filtering apparatus whereby the latter may be supported on the rim of the container adjacent the scene of operations with the filter leaf assembly and by-pass conduit assembly in their respective proper submerged positions within the container and with the filtering apparatus otherwise positioned for efficient washing down and filtering operations.

Other objects and advantages of the invention, not at this time enumerated, will become more readily apparent as the nature of the invention is better undersood.

In the accompanying three sheets of drawings, forming a part of this specification, a preferred embodiment of the invention has been shown, and in these drawings:

Fig. 2 is an enlarged fragmentary perspective view of the filtering apparatus shown in Fig. 1;

Figure 4:
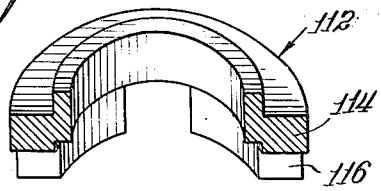
Figure 5:
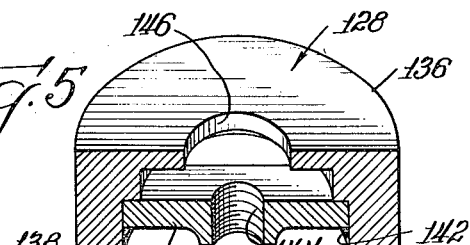

Fig. 3 is an enlarged fragmentary side elevational view of a portion of the filtering apparatus with certain parts being broken away to more clearly reveal the nature of the invention. This view illustrates a filter leaf assembly and a by-pass conduit assembly, employed in connection with the invention, installed in operative washing down position and mounted within a draw-off container, with the container, filter leaf assembly and a portion of the by-pass conduit assembly shown in vertical section;

Fig. 4 is a perspective view, partially in section of a spider element forming a part of the filter leaf assembly; and Fig. 5 is a perspective view similar to Fig. 4 showing a clamping head forming a part of the filter leaf assembly.

In all of the above described views, similar reference characters are employed to designate similar parts.

Figure 1:
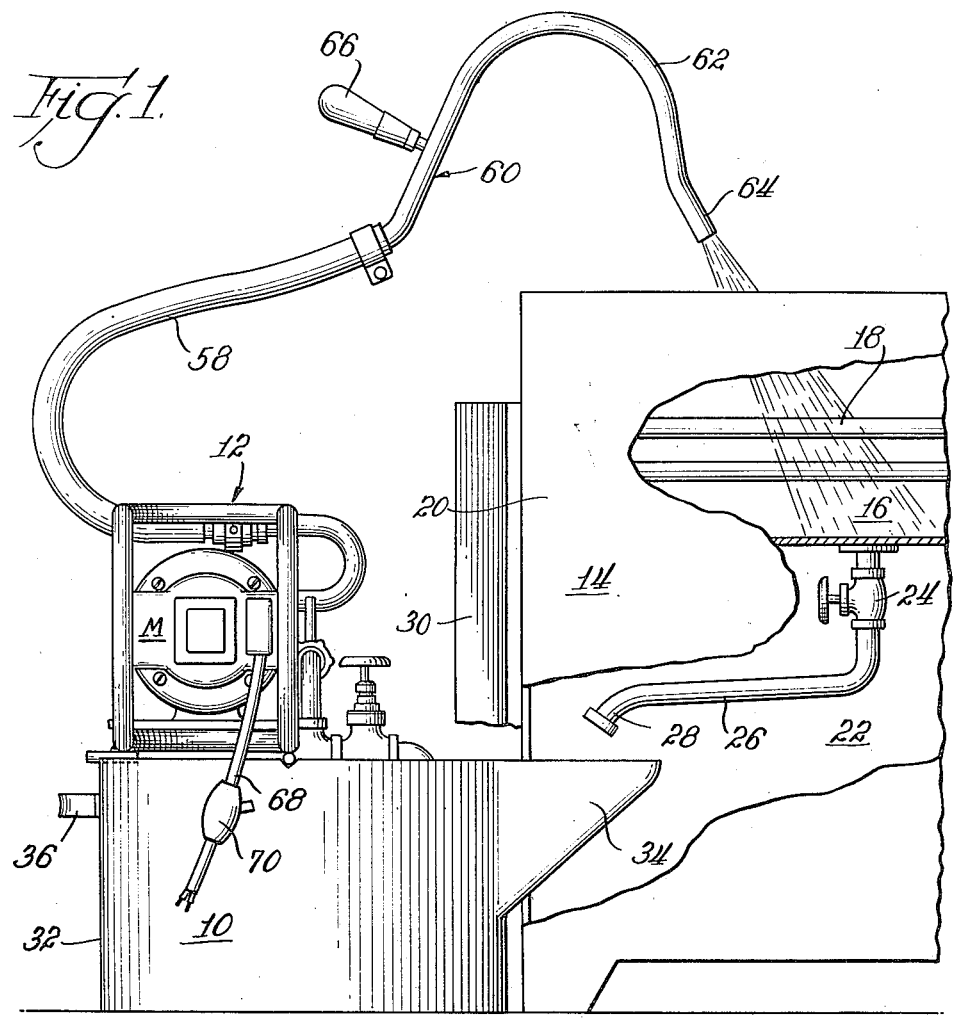
Fig. 1 is a side elevational view of the complete filtering apparatus showing the same in use with a cooking reservoir of a food processing unit in the form of a fryer and showing the latter modified for use with the apparatus.

Referring now to the drawings in detail and particularly to Fig. 1, the filter apparatus comprising the present invention involves in its general organization a container 10, hereinafter referred to as the "draw-off" container, inasmuch as it is employed for the purpose of drawing off hot edible oil from the cooking reservoir of a fryer or other food processing installation for purification purposes. The apparatus further includes an assemblage of filtering instrumentalities designated in their entirety at 12 which is capable of being installed upon the container 10 for the purpose of withdrawing and filtering the drawn-off liquid and returning the same to the cooking reservoir. The container 10 and assembly 12 are shown in operative position relative to a typical food processing installation which, for illustrative purposes, is shown as being in the form of a so-called deep fat fryer 14 having a cooking reservoir 16 adapted to contain the edible oil or fat employed in the cooking process and having associated therewith the usual heat exchange tubes 18 which are suitably disposed within the reservoir below the level of the cooking liquid. The reservoir 16 is supported in and enclosed by a suitable cabinet 20 and the space 22 within the cabinet beneath the reservoir 16 provides an enclosure for many of the fryer operating instrumentalities including a drain cock or valve 24 for the reservoir and a forwardly extending drain spout conduit section 26, the outer downturned end 28 of which assumes an elevated position above the floor or other supporting surface adjacent the front region of the enclosure. A hinged door 30 provides a closure for the otherwise open front end of the chamber 22. In Fig. 1, the door 30 has been broken away in part and the illustration thereof represents the door when swung to a wide-open position, not quite 180° from its closed position, with the door being disposed on the far side of the container 10 as viewed in this figure.

Still referring to Fig. 1, the container 10 is preferably in the form of a relatively deep cylindrical body 32 having an outwardly extending portion 34 formed adjacent its upper rim and assuming the general shape of a pouring spout, but which in reality functions as an extension funnel designed to be projected through the door opening into chamber 22 to a position underlying the downturned end 28 of the spout conduit section 26, with the body portion 32 of the container 10 assuming a position in close proximity to the fryer casing 20. The funnel member 34 may, on occasion, function as a pouring spout when edible oil or fat is to be discarded from the container 10 without filtering. A handle 36 at one side of the body portion 32 may assist in this pouring function and it may also be employed as a handle when the empty container is transported to a particular scene of operation.

The filtering instrumentalities 12 are in the form of an assembly including a filter leaf unit 40 (Figs. 2 and 3) which is operatively connected to the inlet side of a suction pump 42 by means of a delivery conduit including rigid conduit sections 44, 46 and 48 (Fig. 2), the conduit section 44 being connected to the conduit section 46 through a T-fitting 50 and the conduit section 48 through a detachable coupling assembly 52 which may be of conventional design.

The suction pump 42 may be of conventional design and its outlet side is operatively connected through a rigid U-shaped conduit 54 and detachable coupling assembly 56 to a flexible conduit 58 which in turn is connected to a rigid discharge tube 60 having a curved hook-like portion 62 adapted to be positioned over the upper edge or rim portion of the processing reservoir 16, so that the discharge tube 60 may be left in position on the reservoir unattended, if desired. The discharge tube 60 is provided with an outturned end 64 constituitng in effect a jet nozzle by means of which a stream of the edible oil or other liquid undergoing processing may be selectively directed into the reservoir 16 for washing down purposes in a manner that will be made clear presently. An operating handle 66 attached medially to the discharge tube 60 provides a convenient means for manipulating the discharge tube at the end of the flexible conduit section 58. The flexible conduit section 58 may be formed of a suitable material such as "Neoprene" which possesses the necessary degree of flexibility, yet which is impervious to impregnation by the edible oil or fat at normal operating temperatures and which as a consequence is not subject to deterioration.

The suction pump 42 is adapted to be driven by an electric motor M to which current for energizing purposes may be supplied from an electrical outlet (not shown) through a flexible lead cable 68 having a control switch 70 interposed therein.

The motor M is provided with a driving shaft 72 which is coupled as at 74 to the impeller shaft 76 of the pump 42. The motor M and pump 42 are fixedly mounted on a common frame member 78 which is in the form of a substantially closed loop of tubing having reverse bends 80, a lower horizontal supporting portion 82, reverse bends 83, and an upper horizontal handle portion 84 overlying the lower portion 82 in the medial regions thereof and terminating substantially directly above the center of gravity of the motor and pump assembly. The motor M is carried on a platform 86 welded or otherwise secured to the supporting portion 82 of the frame 78 while the pump 42 is mounted on an L-shaped bracket 88 similarly secured to the supporting portion 82 of the frame 78 adjacent an end thereof.

From the above description, it will be seen that the entire filter assembly proper including the motor, pump, filter leaf assembly and all of the operative connections leading to these instrumentalities or existing therebetween may conveniently be transported from one location to the other as an assembled unit by means of the carrying handle portion 84 of the frame 78.

Referring now to Figs. 2 and 3, the T-fitting 50, in addition to establishing communication between the conduit sections 44 and 46, is provided with a branch which communicates through a shut-off valve 90 with a conduit 92 in the form of an elbow and which is hereinafter referred to as the by-pass conduit inasmuch as when the valve 90 is open the liquid undergoing treatment may be drawn from the container 10 and conducted to the processing reservoir 16 directly without passing through the filter leaf 40 and conduit section 44. The by-pass conduit 92 communicates with a strainer or coarse filter assembly designated in its entirety at 94 and the nature and function of which will be described subsequently. It will be understood that the valve 90, hereinafter referred to as the by-pass valve may be of conventional design and is provided with the usual inlet and outlet passages which are in communication with each other through a valve port 96 having associated therewith a valve body 98 carried on a valve stem 100 manually operable under the control of a valve handle 102.

Referring now to Fig. 3, the filter leaf construction may be similar to that shown and described in the above-mentioned co-pending application and in general, is in the form of a hollow perforate generally circular, disc-like member which constitutes a frame for holding a cloth, paper or other filter medium in position thereon, with the filter medium substantially enclosing the disc-like frame member coextensively. More specifically, the filter leaf assembly involves in its general organization a central ring-like member 104, to the underneath side of which there is secured as by welding a lower substantially flat circular perforate filter plate or screen 105 and to the upper side of which there is similarly secured an upper inverted dished perforate plate or screen 106, the two plates 105 and 106 forming therebetween an interior suction chamber 107 of plano-convex design. A porous filter disc or ring 108 is adapted to be removably positioned over the plate 106 and a similar porous filter disc or ring 110 is adapted to be removably positioned below the filter plate 105 coextensively therewith.

The central regions of the upper and lower plates 106 and 105 respectively are maintained in their spaced relationship by means of an inner spider member 112 shown in detail in Fig. 4 and comprising a ring-like member or body including a body portion proper 114 from which there extends downwardly a plurality of clamping shoulders or lugs 116 of which there are preferably four in number. The underneath surfaces of the lugs 116 are adapted to bear against the inner face of the filter plate 105. The filter plate 105 is provided with a central opening 118 in register with the central opening provided in the spider member 112, and a clamping member 120, including a clamping head 122 having a stem 124 projecting axially therefrom and secured thereto by welding as indicated at 126, is disposed within the opening 118 and is adapted to be releasably secured to a cooperating clamping member or head 128 positioned exteriorly of the frame member and on the side of the filter plate 106 remote from the plate 105. The head 120 is formed with an annular peripheral recess providing a shoulder 130 against which the inner rim portion of the plate 105 is adapted to seat with the inner rim of the filter ring 110 interposed therebetween. An annular flange 132 projects upwardly from the body portion 114 of the inner ring member or spider 112 and extends through a central opening 134 provided at the crest of the dish-shaped upper plate 106.

The outer clamping head 128 is illustrated in detail in Fig. 5 and comprises a cup-shaped body portion 136 having a rim portion 138 adapted to seat upon the inner rim portion of the upper filter plate 108, with the inner rim of the filter ring 106 interposed therebetween, and clamp the plate against the body portion 114 of the inner spider 112. A strut or bar 140 is welded as at 142 within the cup-shaped member 136 and projects completely thereacross. The bar 140 is provided with a threaded opening 144 centrally therein designed for reception of the threaded end of the stem 124, which forms a part of the clamping member 120. The base portion of the cup-shaped member 136 is provided with an opening 146 therethrough for receiving the extreme lower end of the conduit section 44 which may be welded as at 148 within the opening.

The end of the stem 124 may be slotted as at 150 for cooperation with the end of a tool such as a screwdriver to facilitate turning of the clamping head 120 for assembling or disassembling the various filter leaf parts.

In order to clamp the filter discs or rings 108 and 110 in position on the hollow filter leaf frame, a pair of opposed marginal clamping rings 152 and 154 (Figs. 2 and 3) are provided having spaced clamping lugs 156 and 158 respectively formed on the periphery thereof with the lugs 156 being in register with the lugs 158. The lugs 158 are threaded as at 160 for reception therein of a series of wing bolts 162 while the lugs 156 are slotted as at 164 to facilitate operation of the clamping rings 152 and 154 by merely loosening the wing bolts without necessitating their complete removal from the assembly. The clamping rings 152 and 154 are adapted to straddle the peripheral edge of the filter leaf frame assembly to clamp the outer peripheral regions of the filter media 108 and 110 against the respective plates 105 and 106.

Referring again to Fig. 3, the strainer or coarse filter 94 carried at the lower end of the by-pass conduit or elbow 92 includes a nipple 166 which is threadedly received on the end of the by-pass conduit and which, in turn, threadedly receives therein the upper end of a standpipe 168 which projects downwardly therefrom a substantial distance and the lower end of which terminates slightly above the general level of the filter leaf assembly 40. A cylindrical foraminous strainer element 170 having its lower end closed by means of a closure plate 172 has its upper end crimped as at 174 over the upper edge of a supporting ring 176 welded or otherwise secured to the outer surface of the nipple 166. The standpipe 168 terminates a slight distance above the closure plate 172.

In order to facilitate placement of the filtering instrumentalities 12 inproper filtering register with the container 10, so that the filter leaf 40 and by-pass conduit 92 assume their proper position within the container, the frame member 78 is adapted to be positioned over and supported upon the rim portion of the container. Toward these ends a series of three notches 178, 180 and 182 (Fig. 2) are formed in the rim of the container 10. An orienting bar 184 is suitably secured as by welding to the underneath side of a longitudinal extent of the frame 78 and is adapted to seat in the notches 178 and 180. A short bar section 186 is similarly secured to another portion of the frame 98 and is adapted to seat in the notch 182. The bars 184 and 186 together with the notches 178, 180 and 182 thus constitute a three-point suspension for the filtering instrumentalities 12.

Operation of the apparatus

In the operation of the above-described purification apparatus, when it is desired to process a particular batch of edible oil contained within the reservoir 16 of a deep fryer, such as the fryer 14 indicated herein, the container 10 and assembly 12 are brought to the scene of operations by the attendant utilizing the handles 36 and 84 respectively for carrying purposes. The door 30 of the fryer is swung to its open position and the spout or funnel portion 34 thereof is projected through the door opening and caused to underlie the outer downturned end 28 of the drain conduit 26. The drain cock 24 may then be opened to transfer the hot oil contained in the reservoir 16 into the container 10 preparatory to the commencement of filtering operations.

It will be frequently found, particularly after a long period of use, that the walls and bottom of the reservoir 16 and the surfaces of the heat exchange tubing 18 will be contaminated with adhering substances such as burned or charred particles of food, coagulated colloids which may have settled out of solution, and other foreign particles. In such an instance, it is desirable to resort to a washing down operation to dislodge these particles. Accordingly, without closing the drain cock 24, and after the filtering instrumentalities have been positioned on the rim of the container 10 in the manner previously described, the motor M is set into operation by means of the control switch 70, while the by-pass valve 90 is fully opened. Because of the relatively small resistance to the passage of fluid therethrough offered by the strainer assembly 94, a relatively large volume flow of the drawn-off liquid is effected through the standpipe 168, by-pass conduit 92, by-pass valve 90, T-fitting 50, conduit section 48, pump 42, conduit sections 54, 58 and discharge tube 60 so that a relatively forceful jet issues from the outturned end 64 of the latter. The attendant, by manipulation of the handle 66, may thus wash down the side walls of the reservoir 16 as well as the outer surfaces of the heat exchange tubes 18. As long as the drain cock 24 remains open, a continuous circuit of the liquid is maintained.

It is to be noted that with the valve 90 open, the suction ordinarily applied to the filter leaf construction 40 is very materially reduced. However, if the subatmospheric pressure maintained within the suction chamber 107 is sufficiently great as to draw fluid through the filter leaf construction, the small amount of incidental filtrate involved will mingle with the by-pass fluid but will have no appreciable effect upon the washing down operation.

During the washing down operations, the strainer 94 will prevent recirculation of any relatively large foreign particles which, through turbulence, may exist in suspension in the body of liquid in the container 10.

When the washing down operation has been completed to the satisfaction of the attendant, the by-pass valve 90 and drain cock 24 may be closed so that the entire suction generated by the pump 42 is applied to the filter leaf construction. Liquid is thus drawn into the suction chamber 107 through the filter media 108 and 110 and is carried through the conduit section 44, T-fitting 50, conduit sections 46 and 48, pump 42, conduit sections 54, 58, and discharge tube 60. At this point in the purification process the hook portion 62 of the discharge tube 60 may conveniently be employed to "hang" the discharge tube 60 over an edge of the reservoir 16 until all of the filtrate is restored to the reservoir. It should be understood that various carbon compounds or compositions of inert material such as diatomaceous earth may be mixed with the edible oils, when they are being filtered, to "sweeten" the oil and assist in settling out and filtering out the impurities.

After the fryer 14 has been serviced in the manner indicated above, the filter instrumentalities 12 may be disassociated from the container 10 for cleaning purposes and replacement of the filter media 108, 110 and the same transported to another scene of operation for use with the container 10 when emptied of its dregs or with a similar fresh container.

It will be understood that slight variations in the process involved utilizing the apparatus of the present invention may be resorted to. For example, during the actual filtering operation, the drain cock 24 may be left partially or fully opened and the liquid circulated between the reservoir 16 and container 10 indefinitely at the discretion of the attendant. Ordinarily, however, one complete exchange of the liquid from the reservoir 16 to the container 10, accompanied by a washing down operation as described above, will suffice for adequate processing and reclaiming of the processed edible oils.

The invention is not to be limited to the exact arrangement of parts shown in the accompanying drawings or described in this specification, as various changes in the details of construction may be resorted to without departing from the spirit of the invention. Only in so far as the invention has particularly been pointed out in the accompanying claims is the same to be limited.

I claim:
1. In a portable apparatus for purifying a body of liquid contained within a reservoir having a drain outlet, a draw-off container adapted to receive the liquid contents of the reservoir through said drain outlet, filter apparatus comprising a filter unit having a filtrate outlet and adapted to be positioned within the container and submerged in the drawn-off liquid, a suction pump having a pump inlet and a pump outlet, a conduit connecting said filtrate outlet to the pump inlet, a flexible conduit capable of directional manipulation connected to the pump outlet and having a discharge outlet adapted for reservoir refilling and washing down operations, a motor for said pump, means operatively connecting said pump and motor in driving relationship, a portable frame upon which the pump and motor are mounted, a by-pass arrangement having less flow resistance than said filter apparatus, said arrangement including a by-pass conduit communicating with the pump inlet, a strainer unit carried at the end of said by-pass conduit and adapted to be submerged in the body of drawn-off liquid, and a valve in said by-pass conduit, whereby when said valve is closed said pump draws a stream of filtered liquid, and when